United States Patent

Onodera et al.

[11] Patent Number: 5,756,658
[45] Date of Patent: May 26, 1998

[54] PROCESS FOR PREPARING STYRENIC RESIN

[75] Inventors: Tsutomu Onodera; Kazuyoshi Fukada; Takashi Saeki, all of Ichihara, Japan

[73] Assignee: Idemitsu Petrochemical Co., Ltd., Tokyo, Japan

[21] Appl. No.: 765,462

[22] PCT Filed: May 23, 1996

[86] PCT No.: PCT/JP96/01359

§ 371 Date: Jan. 27, 1997

§ 102(e) Date: Jan. 27, 1997

[87] PCT Pub. No.: WO96/37353

PCT Pub. Date: Nov. 28, 1996

[30] Foreign Application Priority Data

May 26, 1995 [JP] Japan .................... 7-127726

[51] Int. Cl.$^6$ ........................................ C08J 3/18
[52] U.S. Cl. .................. 528/501; 528/481; 528/502 R; 528/503; 264/102; 264/211.23; 264/331.15; 264/345; 264/571
[58] Field of Search ..................... 528/481, 501, 528/502 R, 503; 264/102, 211.23, 331.15, 345, 571

[56] References Cited

U.S. PATENT DOCUMENTS

| 3,684,252 | 8/1972 | Nissle et al. |
|---|---|---|
| 5,164,479 | 11/1992 | Funaki et al. ............. 528/502 |
| 5,169,893 | 12/1992 | Beck . |

FOREIGN PATENT DOCUMENTS

| 0 311 520 | 4/1989 | European Pat. Off. . |
|---|---|---|
| 0 348 800 | 1/1990 | European Pat. Off. . |
| 1083798 | 9/1967 | United Kingdom . |

OTHER PUBLICATIONS

Patent Abstracts of Japan, vol. 015, No. 216 (C–0837), Jun. 4, 1991, JP 03 064303, Mar. 19, 1991.
Patent Abstracts of Japan, vol. 009, No. 322 (M–440), Dec. 18, 1985, JP 60 157824, Aug. 19, 1985.
Patent Abstracts of Japan, vol. 015, No. 202 (C–0834), May 23, 1991, JP 09 056504, Mar. 12, 1991.
Patent Abstracts of Japan, vol. 011, No. 048 (M–561), Feb. 13, 1987, JP 61 211013, Sep. 19, 1986.
Patent Abstracts of Japan, vol.016, No. 290 (M–1272), Jun. 26, 1992, JP 04 078517, Mar. 12, 1992.
Patent Abstracts of Japan, vol.095, No. 001, Feb. 28, 1995, JP 06 297535, Oct. 25, 1994.
Patent Abstracts of Japan, vol. 012, No. 137 (M–690), Apr. 26, 1988, JP 62 259809, Nov. 12, 1987.

*Primary Examiner*—Fred Teskin
*Attorney, Agent, or Firm*—Oblon, Spivak, McClelland, Maier & Neustadt, P.C.

[57] ABSTRACT

A styrenic resin is prepared by a method which comprises extruding a styrenic polymer powder having a syndiotactic configuration at a molding temperature of from the melting point of the polymer to 400° C. at an extrusion rate meeting the equation $Q/(D \times H \times V) = 2.0 \times 10^4$ to $6.0 \times 10^5$, by the use of an extruder provided with one or more vents having an internal pressure of 0 to 760 Torr, wherein Q is an extrusion rate (kg/hr), D is a screw diameter (m), H is a screw groove depth (m), and V is a screw peripheral speed (m/sec); a residual volatile component, such as a monomer in the styrenic polymer powder having the syndiotactic configuration, can economically and efficiently be decreased at the time of extrusion, whereby a molding material having a good shape and containing a reduced amount of the residual volatile component can efficiently be prepared to prevent the emission of an objectionable odor at the time of the extrusion or molding.

12 Claims, No Drawings

PROCESS FOR PREPARING STYRENIC RESIN

FIELD OF THE INVENTION

The present invention relates to a process for preparing a styrenic resin, and more specifically, it relates to a method for economically and efficiently decreasing a remaining volatile component such as an unreacted monomer in a styrenic polymer powder having a syndiotactic configuration, when the styrenic polymer powder is extruded.

BACKGROUND ART

A styrenic polymer (hereinafter abbreviated to "SPS" sometimes) having a syndiotactic configuration obtained by improving a styrenic polymer having an atactic configuration is excellent in heat resistance and chemical resistance.

The group of the present inventors has already succeeded in the development of a styrenic polymer having a high syndiotacticity, and this group has further disclosed that the SPS can be obtained by the use of a catalyst comprising a titanium compound, a catalytic product (an alkylaluminoxane) of an organic aluminum compound and a condensing agent, or a coordinated complex compound comprising a cation and an anion in which a plurality of groups are bonded to a metal (Japanese Patent Application Laid-open Nos. 187708/1987 and 249503/1992).

When the styrenic polymer having the syndiotactic configuration is prepared by a non-solvent polymerization method or a slurry method, about 0.1 to 50% by weight of a remaining volatile component such as an unreacted monomer is contained in the obtained polymer. In the case that a large amount of the unreacted monomer and the like remains in a product, molding failure occurs, and in films or the like, transparency deteriorates, and molded articles unsuitable for the packing of foods are formed sometime. Therefore, as a post-treatment subsequent to the polymerization, a drying devolatilization treatment using a drying machine is necessary to remove a remaining volatile component such as the monomer therefrom.

However, in the case that the removal of the remaining volatile component is made by the use of the drying machine, a residence time is prolonged, which is not economical.

On the other hand, even when devolatilization and extrusion are carried out by the use of an extruder, the efficiency of the devolatilization noticeably deteriorates, if a large amount of the volatile component is contained. This reason is that an apparent viscosity deteriorates owing to the volatile component contained in a material powder, so that shearing heat in the extruder is poor, with the result that the temperature in the extruder does not sufficiently rise, which disturbs the efficient removal of the volatile component. As a means for raising the temperatue, it can be contrived to increase the rotational frequency of the screw of the extruder.

However, when the rotational frequency of the screw is merely increased, the temperature noticeably rises owing to the shearing heat in a position where the volatile component is removed and the apparent viscosity is increased, so that the decomposition of the resin occurs on occasion.

DISCLOSURE OF THE INVENTION

Under such circumstances, the present inventors have intensively researched with the intention of developing a technique by which the above-mentioned problems can be solved, i.e., by which a remaining volatile component such as a monomer in a styrenic polymer powder having a syndiotactic configuration can economically and efficiently be decreased at the time of extrusion, whereby a molding material having a good shape and containing a less amount of the remaining volatile component can efficiently and stably be prepared to prevent the emission of a bad smell at the time of the extrusion or molding.

As a result, it has been found that the above-mentioned theme can be achieved by carrying out the extrusion under specific conditions by the use of an extruder. The present invention has been completed on the basis of the found knowledge.

That is to say, the first aspect of the present invention is directed to a process for preparing a styrenic resin which comprises the step of extruding a styrenic polymer powder having a syndiotactic configuration at a molding temperature of from the melting point of the polymer to 400° C. at an extrusion rate (kg/hr) meeting the equation $Q/(D \times H \times V) = 2.0 \times 10^4$ to $6.0 \times 10^5$ [wherein Q is an extrusion rate (kg/hr); D is a screw diameter (m); H is a screw groove depth (m); and V is a screw peripheral speed (m/sec)] by the use of an extruder provided with one or more vents having an internal pressure of 0 to 760 Torr to obtain the styrenic resin in which the remaining volatile component is remarkably reduced.

Furthermore, the second aspect of the present invention is directed to a process for preparing a styrenic resin which comprises the step of extruding a styrenic polymer powder having a syndiotactic configuration at a molding temperature of from the melting point of the polymer to 400° C. at an extrusion rate (kg/hr) meeting the equation $Q/(D \times H \times V) = 2.0 \times 10^4$ to $6.0 \times 10^5$ [wherein Q is an extrusion rate (kg/hr); D is a screw diameter (m); H is a screw groove depth (m); and V is a screw peripheral speed (m/sec)] by the use of a plurality of serially connected extruders, at least one of these extruders being provided with one or more vents having an internal pressure of 0 to 760 Torr, to obtain the styrenic resin in which the remaining volatile component is remarkably reduced.

In addition, the third aspect of the present invention is directed to a process for preparing a styrenic resin which comprises the step of extruding a styrenic polymer powder having a syndiotactic configuration at a molding temperature of from the melting point of the polymer to 400° C. at an extrusion rate meeting the equation $Q/(D \times H \times V) = 2.0 \times 10^4$ to $6.0 \times 10^5$ [wherein Q is an extrusion rate (kg/hr); D is a screw diameter (m); H is a screw groove depth (m); and V is a screw peripheral speed (m/sec)] by the use of one extruder or a plurality of serially connected extruders and a gear pump installed on the most downstream side of the extruders, at least one of the extruders being provided with one or more vents having an internal pressure of 0 to 760 Torr, to obtain the styrenic resin in which the remaining volatile component is remarkably reduced.

BEST MODE FOR CARRYING OUT THE INVENTION

A styrenic polymer which can be applied in a preparation process of the present invention has a syndiotactic configuration. Here, the syndiotactic configuration of the styrenic polymer means that its stereochemical structure has a syndiotactic structure, i.e., a steric structure in which phenyl groups and substituted phenyl groups which are side chains are located alternately in opposite directions on a main chain comprising carbon-carbon bonds. Its tacticity can be quantitatively determined by a nuclear magnetic resonance method using an isotopic carbon (a $^{13}$C-NMR method). The tacticity which can be determined by the $^{13}$C-NMR method can be called as follows in accordance with the number of existing plural continuous constitutional units. For example, in the case that the continuous units are two, the tacticity is called a diad; in the case that the continuous units are three, it is called a triad; and in the case that the continuous units are five, it is called a pentad. "The styrenic polymer having the syndiotactic configuration" referred to in the present invention means the styrenic polymer in which the content of the syndiotacticity is usually 75% or more, preferably 85% or more in terms of a racemic diad, or it is usually 30% or more, preferably 50% or more in terms of a racemic pentad. Examples of "the styrenic polymer" include polymers obtained by polymerizing aromatic vinyl compounds as monomers, for example, styrene; alkylstyrenes such as p-methylstyrene, o-methylstyrene, m-methylstyrene, 2,4-dimethylstyrene, 2,5-dimethylstyrene, 3,4-dimethylstyrene, 3,5-dimethylstyrene and p-t-butylstyrene; halogenated styrenes such as p-chlorostyrene, o-chlorostyrene, m-chlorostyrene, p-bromostyrene, o-bromostyrene, m-bromostyrene, p-fluorostyrene, p-fluorostyrene, o-fluorostyrene, m-fluorostyrene and o-methyl-p-fluorostyrene; alkenylstyrenes such as divinylbenzene, p-isopropenylstyrene, 4-vinylbiphenyl, 3-vinylbiphenyl and 2-vinylbiphenyl; alkoxystyrenes such as methoxystyrene and ethoxystyrene; and aminostyrenes such as dimethylaminostyrene and diphenylaminostyrene, copolymers obtained by copolymerizing two or more kinds of these aromatic vinyl compounds as comonomers, mixtures of these polymers and copolymers, and these substances to which various kinds of additives such as pigments are added.

Furthermore, no particular restriction is put on the molecular weight of this styrenic polymer, but its weight-average molecular weight is preferably 10000 to 3000000, more preferably 50000 to 1500000. In addition, the width of a molecular weight distribution is not limited, either, and the styrenic polymers having various molecular weight distributions are applicable. This melting point of the styrenic polymer having the syndiotactic configuration is in the range of 160° to 310° C., and hence, the heat resistance of this kind of styrenic polymer is much more excellent, as compared with a conventional styrenic polymer having an atactic configuration.

No particular restriction is put on a preparation method of the styrenic polymer having the syndiotactic configuration, but this styrenic polymer can be prepared by polymerizing a styrenic monomer (which corresponds to the above-mentioned styrenic polymer) in the presence of a known catalyst comprising (a) a transition metal compound, (b) a coordinated complex compound comprising a cation and an anion in which a plurality of groups are bonded to a metal, or an aluminoxane, and if necessary, (c) an alkyl group-containing metallic compound.

In the present invention, a devolatilization treatment can be carried out in extruding the thus prepared styrenic polymer having the syndiotactic configuration by an extruder, whereby a volatile component such as the unreacted monomer which remains in the polymer can be removed therefrom. A volatile component such as the monomer which is usually contained in an amount of about 0.1 to 50% by weight in the polymer can be decreased to 3000 ppm or less without decreasing the amount of the polymer subjected to the devolatilization treatment. Furthermore, when the extrusion rate is set to a low level or when the previously dried polymer is used, the content of the volatile component can be decreased to 1000 ppm or less. As the extruder which can be used in this devolatilization treatment, a vent type extruder having one vent, preferably two or more vents can be used, but this type extruder may optionally serially be combined with one or more of a single screw extruder, an intermeshing type co-rotating twin-screw extruder, an intermeshing extruder, a non-intermeshing counter-rotating twin-screw extruder and the like, and a gear pump may be installed on the downstream side of the extruders. The internal pressure of the vents is in the range of 0 to atmospheric pressure, preferably 0 to 200 Torr, more preferably 0 to 50 Torr. If the internal pressure of the vents is too high, it is difficult to accomplish the sufficient devolatilization.

The extrusion is preferably carried out at a molding temperature in the range of from the melting point of the polymer to 400° C. at an extrusion rate meeting the equation $Q/(D \times H \times V) = 2.0 \times 10^4$ to $6.0 \times 10^5$ [wherein Q is an extrusion rate (kg/hr); D is a screw diameter (m); H is a screw groove depth (m); and V is a screw peripheral speed (m/sec)]. The preferable range of the extrusion rate Q is in the range of $Q/(D \times H \times V) = 6.0 \times 10^4$ to $6.0 \times 10^5$, more preferably $Q/(D \times H \times V) = 1.0 \times 10^5$ to $5.0 \times 10^5$. If the value obtained from the above-mentioned equation is less than $2.0 \times 10^4$, a treatment performance is poor sometimes, and on the other hand, if it is more than $6.0 \times 10^5$, the removal of the remaining volatile component is insufficient.

The screw peripheral speed of the extruder depends upon the diameter of the screw, the amount of the polymer to be treated and the like, but it is preferably in the range of 0.1 to 4.5 m/sec, more preferably 0.2 to 4.0 m/s, most preferably 0.5 to 3.5 m/s in order to efficiently promote surface renewal at the vents. If the peripheral speed is in excess of 4.5 m/sec, heat is abnormally generated, and a required power cost increases inconveniently.

In the present invention, when a plurality of serially connected extruders, preferably two serially connected extruders are used for the extrusion, the extrusion is carried out at a temperature in the range of from the melting point of the polymer to 400° C. in every extruder. All the extruders except at least one extruder, preferably the extruder positioned on the most upstream side are each provided with one or more vents having an internal pressure of 0 to 760 Torr, and the extrusion is carried out under conditions in which the extrusion rate of the extruder equipped with at least vent, preferably the extrusion rates of all the extruders meet the equation $Q/(D \times H \times V) = 2.0 \times 10^4$ to $6.0 \times 10^5$ [wherein Q is an extrusion rate (kg/hr); D is a screw diameter (m); H is a screw groove depth (m); and V is a screw peripheral speed (m/sec)].

In the present invention, a resin temperature at the time of the extrusion is preferably required to be in the range of from the melting point of the styrenic polymer to 400° C. If the resin temperature is more than 400° C., the styrenic polymer tends to decompose. Accordingly, the resin temperature is preferably in the range of from the melting point of the polymer to 370° C. In this case, the cylinder temperature of the extruder is preferably set in the range of from room temperature to 400° C., more preferably from a glass transition temperature to 400° C., most preferably from the melting point of the resin to 370° C. Furthermore, shear stress at the extrusion is usually $1 \times 10^6$ Pa or less, preferably $5 \times 10^5$ Pa or less. If the shear stress is too large, melt fracture occurs, so that extruded pellets have an abnormal shape sometimes, which might lead to a trouble in a next molding step.

In order to heighten the efficiency of the devolatilization, an inert liquid such as nitrogen, argon, helium or carbon dioxide or an inert liquid such as water can be poured into the extruder. The feed of water is particularly preferable, because the amount of the unreacted monomer can be reduced. The amount of the inert gas to be poured depends upon its kind and a treatment rate, but it is usually in the range of 1 ml to 10 l based on 1 kg of the polymer. Moreover, the amount of the inert liquid such as water to be poured also depends upon its kind and the treatment rate, but it is usually in the range of 0.05 to 2.5% by weight based on the weight of the polymer material.

Next, the present invention will be described in more detail with reference to examples and comparative examples, but the scope of the present invention should not be limited to these examples.

EXAMPLE 1

A styrenic polymer powder of a syndiotactic configuration having a weight-average molecular weight of 330000 and an average particle diameter of 160 μm and containing 30% by weight of styrene as a remaining monomer on the basis of its wet state was devolatilized and extruded under conditions of a cylinder temperature of 290° C., a molding temperature of 300° to 320° C., a first vent internal pressure of 200 Torr and a second vent internal pressure of 20 Torr, a screw peripheral speed of 0.5 m/sec (co-rotation) and an extrusion rate of 28 kg/hr by the use of a twin-screw extruder made by The Japan Steel Works, Ltd. (TEX44-XCT (L/D=38.5, D=47 mm, H=9.0 mm and vent number=2)]. The value of Q/(D×H×V) was $1.32 \times 10^5$, and shear stress was $2 \times 10^4$ Pa.

The amount of the remaining monomer in the resulting polymer collected in the form of pellets was measured by a gas chromatography, and as a result, it was apparent that 900 ppm of the styrene monomer was contained in the polymer.

EXAMPLES 2 AND 3

Devolatilization and extrusion were carried out by the same procedure as in Example 1 except that materials containing 1.8% by weight and 1000 ppm of an unreacted monomer were used in Examples 2 and 3, respectively, and an extrusion rate was set to 55 kg/hr. The amounts of the remaining monomer in obtained pellets were shown in Table 1. The value of Q/(D×H×V) was $2.60 \times 10^5$, and shear stress was $3.5 \times 10^4$ Pa.

COMPARATIVE EXAMPLE 1

Devolatilization and extrusion were carried out by the same procedure as in Example 1 except that a material containing 37% by weight of an unreacted monomer was used and an extrusion rate was set to 200 kg/hr. The amount of the remaining monomer in obtained pellets was shown in Table 1. The value of Q/(D×H×V) was $9.46 \times 10^5$.

TABLE 1

|  | Extrusion Rate (kg/hr) | Unreacted Monomer in Material | Unreacted Monomer in Product (ppm) |
|---|---|---|---|
| Example 1 | 28 | 30 wt % | 900 |
| Example 2 | 55 | 1.8 wt % | 1000 |
| Example 3 | 55 | 1000 ppm | 500 |
| Comp. Ex. 1 | 200 | 37 wt % | 5400 |

EXAMPLE 4

A styrenic polymer powder of a syndiotactic configuration having a weight-average molecular weight of 340000 and containing 17% by weight of styrene as a remaining monomer on the basis of its wet state was devolatilized and extruded by the use of two serially connected twin-screw extruders made by The Japan Steel Works, Ltd. [TEX65 (D=69 mm, H=12.5 mm)] in which the extruder on a downstream side was provided with three vents, under conditions of a cylinder temperature of 290° to 320° C., a first vent internal pressure of 700 Torr, a second vent internal pressure of 10 Torr and a third vent internal pressure of 10 Torr, screw peripheral speeds of 1.1 m/sec (the first extruder) and 0.55 m/sec (the second extruder) and an extrusion rate of 166 kg/hr. The values of Q/(D×H×V) were $1.75 \times 10^5$ (the first extruder) and $3.50 \times 10^5$ (the second extruder), and shear stress was $6.9 \times 10^4$ Pa.

The amount of the remaining monomer in the resulting polymer collected in the form of pellets was measured by a gas chromatography, and as a result, it was apparent that 1200 ppm of the styrene monomer was contained in the polymer.

EXAMPLE 5

Devolatilization and extrusion were carried out by the same procedure as in Example 4 except that screw peripheral speeds were set to 1.64 m/sec (the first extruder) and 0.73 m/sec (the second extruder), and an extrusion rate was set to 250 kg/hr. The value of Q/(D×H×V) were $1.76 \times 10^5$ (the first extruder) and $3.97 \times 10^5$ (the second extruder), and shear stress was $7.7 \times 10^4$ Pa. The amount of a remaining monomer in obtained pellets was 2500 ppm.

EXAMPLE 6

A styrenic polymer powder of a syndiotactic configuration having a weight-average molecular weight of 350000 and containing 24% by weight of styrene as a remaining monomer on the basis of its wet state was devolatilized and extruded by the use of two serially connected twin-screw extruders made by Toshiba Machine Co., Ltd. [TEM48 (D=48 mm, H=8.7 mm) and TEM58 (D=58 mm, H=10.5 mm) in which the extruder on a downstream side was provided with four vents, under conditions of a cylinder temperature of 250° to 320° C., a molding temperature of 325° C., a first vent internal pressure of 200 Torr, a second vent internal pressure of 100 Torr, a third vent internal pressure of 20 Torr and a fourth vent internal pressure of 50 Torr, screw peripheral speeds of 0.88 m/sec (the first extruder) and 0.49 m/sec (the second extruder) and an extrusion rate of 135 kg/hr. The values of Q/(D×H×V) were $3.67 \times 10^5$ (the first extruder) and $4.52 \times 10^5$ (the second extruder), and shear stress was $5.4 \times 10^4$ Pa.

The amount of the remaining monomer in the resulting polymer collected in the form of pellets was measured by a gas chromatography, and as a result, it was apparent that 2800 ppm of the styrene monomer was contained in the polymer.

REFERENCE EXAMPLE 1

Devolatilization and extrusion were carried out by the same procedure as in Example 6 except that screw peripheral speeds were set to 1.13 m/sec (the first extruder) and 0.82 m/sec (the second extruder), and an extrusion rate was set to 323 kg/hr. The values of Q/(D×H×V) were $6.84 \times 10^5$ (the first extruder) and $6.49 \times 10^5$ (the second extruder), and shear stress was $1.2 \times 10^6$ Pa. The amount of a remaining monomer in obtained pellets was 4000 ppm.

EXAMPLE 7

A styrenic polymer powder of a syndiotactic configuration having a weight-average molecular weight of 300000 and containing 20% by weight of styrene as a remaining monomer on the basis of its wet state was devolatilized and extruded by the use of a twin-screw extruder having four vents made by The Japan Steel Works, Ltd. [TEX65 (D=69 mm, H=12.5 mm) and a gear pump connected thereto on its downstream side under conditions of a cylinder temperature of 100° to 320° C., a molding temperature of 340° C., a first vent internal pressure of 360 Torr, a second vent internal pressure of 10 Torr, a third vent internal pressure of 10 Torr and a fourth vent internal pressure of 10 Torr, a screw peripheral speed of 0.72 m/sec and an extrusion rate of 160 kg/hr. The value of Q/(D×H×V) was $2.58×10^5$, and shear stress was $6.8×10^4$ Pa.

The amount of the remaining monomer in the resulting polymer collected in the form of pellets was measured by a gas chromatography, and as a result, it was apparent that 2600 ppm of the styrene monomer was contained in the polymer.

POSSIBILITY OF INDUSTRIAL UTILIZATION

As described above, according to a preparation process of the present invention, a remaining volatile component such as a monomer in a polymer obtained by polymerization can efficiently be removed in a short period of time, whereby the quality of the obtained polymer and its molded articles can be improved and an operation at the preparation can also be stabilized.

Therefore, it is expected that the process of the present invention can widely and effectively be utilized as the practical extrusion and purification technique of a styrenic polymer having a syndiotactic configuration.

We claim:

1. A process for preparing a styrenic resin which comprises the step of extruding a styrenic polymer powder having a syndiotactic configuration, at a molding temperature of from the melting point of the polymer to 400° C., at an extrusion rate meeting the equation $Q/(D×H×V)=2.0×10^4$ to $6.0×10^5$, by the use of an extruder provided with one or more vents having an internal pressure of 0 to 760 Torr;

wherein Q is an extrusion rate kg/hr); D is a screw diameter (m); H is a screw groove depth (m); and V is a screw peripheral speed (m/sec).

2. The process for preparing a styrenic resin according to claim 1 wherein the extruder has two or more vents.

3. The process for preparing a styrenic resin according to claim 1 wherein the average molecular weight of the styrenic polymer powder is in the range of 10000 to 3000000.

4. The process for preparing a styrenic resin according to claim 1 wherein the cylinder temperature of the extruder is in the range of from room temperature to 400° C.

5. A process for preparing a styrenic resin which comprises the step of extruding a styrenic polymer powder having a syndiotactic configuration, at a molding temperature of from the melting point of the polymer to 400° C., at an extrusion rate meeting the equation $Q/(D×H×V)=2.0×10^4$ to $6.0×10^5$, by the use of a plurality of serially connected extruders, at least one of these extruders being provided with one or more vents having an internal pressure of 0 to 760 Torr;

wherein Q is an extrusion rate (kg/hr); D is a screw diameter (m); H is a screw groove depth (m); and V is a screw peripheral speed (m/sec).

6. The process for preparing a styrenic resin according to claim 5 wherein all the extruders except the extruder positioned on the most upstream side of the plurality of extruders are each provied with one or more vents having an internal pressure of 0 to 760 Torr.

7. The process for preparing a styrenic resin according to claim 5 wherein the average molecular weight of the styrenic polymer powder is in the range of 10000 to 3000000.

8. The process for preparing a styrenic resin according to claim 5 wherein the cylinder temperature of the extruder is in the range of from room temperature to 400° C.

9. A process for preparing a styrenic resin which comprises the step of extruding a styrenic polymer powder having a syndiotactic configuration, at a molding temperature of from the melting point of the polymer to 400° C., at an extrusion rate meeting the equation $Q/(D×H×V)=2.0×10^4$ to $6.0×10^5$, by the use of one extruder or a plurality of serially connected extruders and a gear pump installed on the most downstream side of the extruders, at least one of said extruder being provided with one or more vents having an internal pressure of 0 to 760 Torr;

wherein Q is an extrusion rate (kg/hr); D is a screw diameter (m); H is a screw groove depth (m); and V is a screw peripheral speed (m/sec).

10. The process for preparing a styrenic resin according to claim 9 wherein all the extruders except the extruder positioned on the most upstream side of the plurality of extruders are each provided with one or more vents having an internal pressure of 0 to 760 Torr.

11. The process for preparing a styrenic resin according to claim 9 wherein the average molecular weight of the styrenic polymer powder is in the range of 10000 to 3000000.

12. The process for preparing a styrenic resin according to claim 9 wherein the cylinder temperature of the extruder is in the ange of from room temperature to 400° C.

* * * * *